Feb. 9, 1943.    R. B. CAMPBELL    2,310,677
REGULATING VALVE
Filed Feb. 28, 1939

INVENTOR
RODNEY B. CAMPBELL
BY HARRIS, KIECH, FOSTER & HARRIS
FOR THE FIRM
ATTORNEYS.

Patented Feb. 9, 1943

2,310,677

UNITED STATES PATENT OFFICE 2,310,677

REGULATING VALVE

Rodney B. Campbell, Los Angeles, Calif., assignor to John Eley, Jr., Los Angeles, Calif.

Application February 28, 1939, Serial No. 258,975

5 Claims. (Cl. 137—53)

My invention relates to valve devices, and more particularly to a valve device adapted to maintain the fluid pressure in a pressure system below a predetermined maximum value.

The invention is of particular utility in connection with a pressure operating system employing a liquid, such as oil, under relatively high pressure, and will be described in connection therewith, although it will be understood that the invention can be used in conjunction with other types of fluid pressure systems and I do not intend to be limited to the type described.

It is a primary object of my invention to provide a valve device for a fluid operating system, the valve device and fluid system being so constructed that when the pressure of fluid in a working portion of the fluid system rises above a predetermined maximum value the valve device will open and cause the pressure in the working system to drop below said maximum value. A further object of my invention is to provide such a valve device in which the valve mechanism is adapted to be positively and rapidly opened or closed so as to prevent excessive heating of the operating fluid upon operation of the valve device. Another object of the invention is to provide such a valve device which includes check valve means for holding the working pressure in the working portion of the fluid system.

Other objects and advantages will appear from the following specification and the drawing, which are for the purpose of illustration only, and in which.

Figure 1:
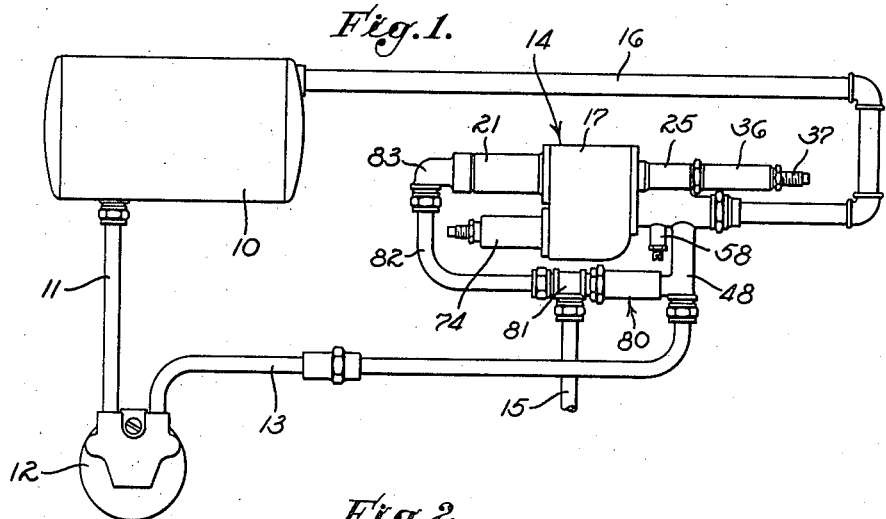
Fig. 1 is a diagrammatic view of a fluid pressure system incorporating my invention.

Referring to Fig. 1 of the drawing, I show a fluid system in which the elements are diagrammatically indicated, the system including a fluid reservoir 10 connected by a pipe 11 to an engine pump 12 which may be of any type well known in the art capable of delivering fluid under high pressure therefrom. The output of the engine pump 12 is connected by suitable piping 13 to a valve means 14 and to a working system pipe 15, as will be described hereinafter. The valve means 14 is connected by a suitable conduit 16 to the fluid reservoir 10.

The valve means 14 has a main housing 17 providing a central chamber 18, the main housing having an opening 19 in one side thereof axially aligned with a bore 20 of a surge barrel 21 rigidly secured to the main housing 17 as by bolts 22. Axially aligned with the opening 19, the main housing 17 is provided with an opening 23 which in turn is axially aligned with a bore 24 of a by-pass valve housing 25, the by-pass valve housing being rigidly connected to the main housing 17 as by bolts 26 or otherwise. Rigidly secured in the bore 20 is a cylinder liner 27 in which a piston element 28 is slidably disposed. The piston element 28 is comprised of a plurality of U-cupped packing members 29, being separated by packing spacers 30, the packing members and spacers being held by a nut 31 on a projection 32 formed on a hollow piston rod 33 which extends through the central chamber 18 and is journaled in the opening 23 to extend into the bore 24 of the by-pass valve housing 25. The hollow piston rod 33 has formed thereon an annular flange 34 positioned in the central chamber 18 for a purpose to be described hereinafter.

The outer end of the bore 24 of the by-pass valve housing 25 is closed by a surge spring sleeve 36 threadedly received in the bore, the outer end of the sleeve being closed by an adjustable screw plug 37 adapted to be screwed into or out of the sleeve by means of a wrench fitting 38 formed on the outer end thereof as is well known in the art. An annular flange member 39 is carried on the inner end of the adjustable screw plug 37 abutting against one end of a main compression spring 40, the other end of which extends through the interior of the hollow piston rod 33 and abuts against the closed end thereof. It will thus be evident that by screwing the adjustable screw plug 37 into or out of the surge spring sleeve 36 the compression on the main compression spring 40 may be altered for a purpose to be described hereinafter.

Also formed in the by-pass valve housing 25 is a valve bore 41 having a counterbore 42 axially aligned therewith. One end of the conduit 16 communicates with the counterbore 42, having a fluid connection with the by-pass valve housing 25 through a threaded collar 43. Rigidly held in the counterbore 42 is a tubular valve sleeve 44 having a packing member 45 at one end thereof so as to form a fluid-tight fit between the valve sleeve and the by-pass valve housing 25, and abutting at its other end against a spacer element 46 held in place by the threaded collar 43. The tubular valve sleeve 44 is provided intermediate its ends with an annular channel 47 which communicates directly with the interior of a pipe fitting 48 formed on the by-pass valve housing 25 and adapted to be connected by threads 49 to the piping 13 leading from the engine pump 12.

Forming a sliding fluid-tight fit with the interior of the tubular valve sleeve 44 is a valve rod 50 having a bore 51 in one end thereof. Formed in the wall of the valve rod 50 is a discharge orifice 52 adapted to register with the valve orifice 44a when the valve rod 50 is in its rightward position relative to the valve sleeve 44.

The inner end of the valve rod 50 is pivotally connected by means of a pivotal link connection 54 to an actuating rod 55. Adjacent the inner end of the valve rod 50 is an annular groove 56 adapted to be engaged by a locking ball 57 normally held in pressure engagement with the valve rod 50 by a small spring 58 abutting against an adjustable screw 59.

The inner end of the actuating rod 55 is pivotally connected by means of a suitable pivot pin 60 to a cam rocker plate 61 pivotally secured to the main housing 17 by a suitable pivot bolt 62. The rocker plate 61 is provided with engaging dogs 63 and 64 adapted to be engaged by the annular flange 34 of the hollow piston rod 33 as described hereinafter, and is provided with a projection 65 having cam faces 66 and 67 formed on each side thereof. Adapted to engage the cam faces 66 and 67 is a roller 69 rotatably secured on a roller pin 70 secured to a plate member 71 secured to or formed integrally with a hollow sleeve member 72. The hollow sleeve member 72 is slidably disposed in a line sleeve 73 in a plunger housing 74 suitably secured to the main housing 17 as by bolts 75. An adjustment screw 76 is threadedly received in the outer end of the plunger housing 74, and carries on its inner end a flange element 77 which abuts against one end of a plunger spring 78, the other end of which engages the end of the sleeve member 72. The outer end of the adjustment screw 76 is provided with a wrench fitting 79, and by screwing the adjustment screw into or out of the plunger housing 74 the compression on the plunger spring 78 may be varied as described hereinafter.

The piping 13 is at all times in open communication with the working system pipe 15 through the pipe fitting 48, a check valve means 80, and a T-joint 81. Also connected to the T-joint 81 is one end of a regulating pipe 82, the other end of which is connected through a suitable coupling 83 to the outer end 84 of the surge barrel 21. It will thus be observed that the oil or other operating fluid in the working system pipe 15 is at all times in open communication with the outer end of the piston element 28, through the medium of the check valve means 80, the fluid pressure thereof tending at all times to move the piston element 28 to the right, as seen in Fig. 2.

Figure 4:
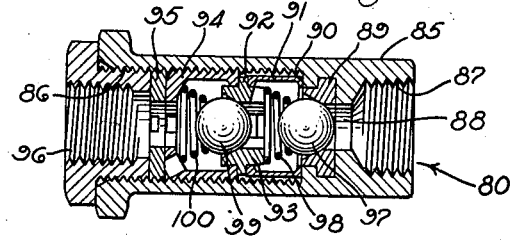
Fig. 4 is an enlarged cross-sectional view of the novel check valve means of my invention.

The check valve means 80, shown in detail in Fig. 4, has an outer tubular housing 85 having a threaded main bore 86 at one end and a threaded counterbore 87 at the other end, the bores being connected by a central passage 88 axially aligned with a first annular seat member 89 rigidly secured in the housing 85. The first seat member 89 is preferably cast integrally with the tubular housing 85, as described hereinafter, but it will be evident that I do not intend to be limited to such construction and that the first seat member may be secured in the tubular housing in any manner well known in the art. An annular shoulder 90 is formed on the interior of the tubular housing 85, which is engaged by one end of a tubular sleeve 91, the other end thereof bearing against one side of an annular flange 92 formed on a second annular seat member 93. The other side of the flange 92 is engaged by a threaded sleeve 94 which is threaded into the main bore 86, the sleeves 91 and 94 retaining the second seat member in rigid position relative to the tubular housing 85. A lock nut 95 is threaded into the main bore 86 to engage the threaded sleeve 94 to retain it securely in place, and an outer pipe fitting 96 is also threaded into the main bore to permit the check valve means 80 to be connected to the T-joint 81. Adapted to seat in the first annular seat member 89 is a first ball valve element 97, normally held in seated position by a first compression spring 98, and adapted to seat in the second annular seat member 93 is a second ball valve element 99, normally held in seated position by a second compression spring 100.

The tubular housing 85 is preferably cast from duralumin or other suitable material, having the first annular seat member 89 cast integrally therewith. I have found that if the first annular seat member is first formed of steel having a very high temper (Burnell rating) so as to render it extremely hard, when it is later cast into the tubular housing 85 the casting process draws sufficient of its temper to render it extremely tough without unduly decreasing its hardness. This method provides a seat member of a desired hardness, and having highly desirable wear-resisting characteristics, in a housing in which hardness is unnecessary, and this method is an important feature of my invention.

Figure 2:
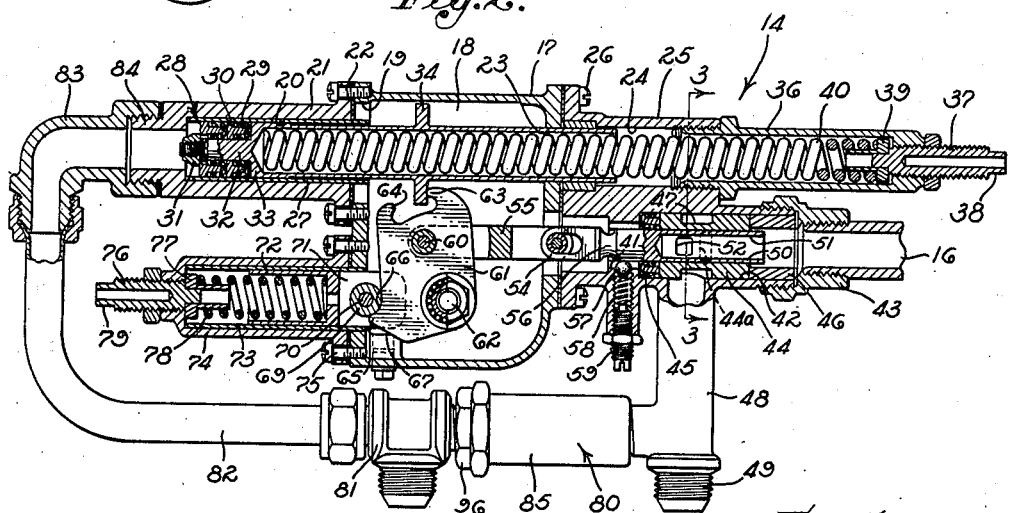
Fig. 2 is an elevational sectional view of the valve means of my invention.
Figure 3:
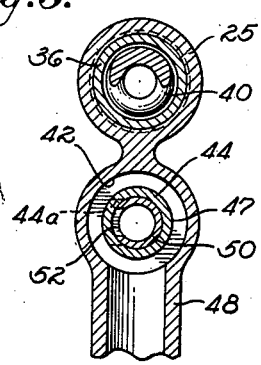
Fig. 3 is a cross-sectional view taken on the line 3—3 of Fig. 2.

In operation, the adjustable screw plug 37 is set so as to put the main compression spring 40 under the desired compression which will tend to resist movement of the piston element 28 to the right from the position shown in Fig. 2. As will be evident, the pressure of the operating fluid in the piping 13 and the working system pipe 15 is at all times tending to move the piston element 28 to the right, as shown in Fig. 2, and the main compression spring 40 is set to a desired tension by adjustment of the adjustable screw plug 37 so as to tend to prevent rightward movement of the piston element so long as the pressure of the operating fluid is below a predetermined maximum value. The check valve means 80 at all times prevents the escape of operating fluid from the working system pipe 15 to the pipe fitting 48, but permits a reverse flow when the pressure of the operating fluid in the working system pipe 15 drops below the pressure of the fluid supplied by the engine pump 12 through the piping 13, thus holding a reserve pressure in the working system pipe 15. When, however, the pressure of the operating fluid rises above such maximum value, which in operation may be, for example, 500 pounds per square inch pressure, the excess pressure of the operating fluid overbalances the main compression spring 40 and forces the piston element and the hollow piston rod 33 connected thereto to the right from the position shown in Fig. 2. When the parts are positioned as shown in Fig. 2, the operating fluid can flow from the engine pump 12 through the piping 13, the pipe fitting 48, the check valve means 80, the T-joint 81, and into the working system pipe 15 to build up the pressure therein, which is the normal position of the parts of the device, and in which the discharge orifice 52 of the valve rod 50 is out of alignment with the valve orifice 44a, so that no operating fluid can flow therethrough to the conduit 16. In such position, the annular flange 34 on the hollow piston rod 33 engages the engaging dog 63. Upon rightward movement of the hollow piston rod 33 from the position shown in Fig. 2, the flange 34 bearing against the engaging dog 63 rotates the cam rocker plate 61 in a clockwise direction about the pivot bolt 62 against the action of the plunger spring 78 acting through the hollow sleeve member 72, the plate member 71, and the roller 69 bearing against the cam plate. Upon such clockwise movement of the cam rocker plate 61, the actuating rod 55 is moved to the right, as seen in Fig. 2, which operates through the pivotal link connection 54 to move the valve rod 50 to the right. Likewise, the roller 69 travels up the cam face 66 until it moves over the tip of the projection 65, at which time it rolls down the cam face 67 with a sudden cam movement, causing a final acceleration in the movement of the valve rod 50 until the discharge orifice 52 registers with the valve orifice 44a, thus providing a sudden opening of communication between these orifices, and at the same time the annular groove 56 comes into position opposite the locking ball 57 which is moved by the action of the small spring 58 into the annular groove to lock the valve rod in its extreme rightward position. Operating fluid in the working system pipe 15 cannot discharge back through the check valve means 80, but fluid supplied by the engine pump 12 can then discharge through the pipe fitting 48, the annular channel 47, the discharge orifice 52, the valve orifice 44a, and into the conduit 16 from whence it flows into the fluid reservoir 10. The engine pump 12 then pumps operating fluid through the piping 13, the valve means 14, the conduit 16, the reservoir 10, and draws fluid from the reservoir through the pipe 11 to form a closed pumping system. This operation continues until the pressure of the operating fluid in the working system pipe 15 drops below the maximum pressure value for which the valve means 14 is set, and due to the operation of the check valve means 80 a reserve pressure is maintained on the fluid in the working system pipe 15.

When the pressure in the working system pipe 15 drops below the pressure for which the valve means 14 is set, the fluid pressure bearing against the outer end of the piston element 28 will drop below the pressure exerted by the main compression spring 40, and the main compression spring will then move the hollow piston rod 33 to the left, toward the position shown in Fig. 2. Uninterrupted movement of the hollow piston rod 33 will continue until the annular flange 34 engages the engaging dog 64 of the cam rocker plate 61, temporarily retarding movement until the leftward pressure exerted by the main compression spring 40 overbalances the pressure exerted by the small spring 58 on the locking ball 57, at which time the locking ball will be forced out of the annular groove 56, and by reason of the stored energy in the main compression spring 40, the valve rod 50 is snapped to the left to move the discharge orifice out of registry with the valve orifice 44a to close communication between the pipe fitting 48 and the conduit 16. This snap action of the valve rod 50 is augmented by the action of the roller 69 on the cam face 66 when the roller moves up from the cam face 67 over the peak of the projection 65 and down on the cam face 66, this action tending to snap the cam rocker plate 61 in a counter-clockwise direction to close communication with the conduit 16 as described. Operating fluid from the engine pump 12 will then rise above the pressure of the fluid in the working system pipe 15 and will be conveyed through the piping 13 directly to the working system pipe 15 through the check valve means 80 until such time as the fluid pressure in the working system pipe again rises above the predetermined value for which the valve means is set, at which time it will again automatically operate as set forth hereinabove to release the pressure in the piping 13, and fluid therein will no longer flow therefrom through the check valve means 80 but will be discharged directly into the conduit 16. Due to the positive snap action of the valve rod 50 in both directions to open and close the communication with the conduit 16, excessive heating of the operating fluid is eliminated upon a rise in pressure, which is an important feature of the invention. It is also to be noted that by increasing materially the tension of the small spring 58 and the plunger spring 78 by adjustment thereof, open communication with the conduit 16 may be maintained until the pressure of the operating fluid reaches its predetermined low value, which is an important feature under some conditions of installation.

The construction and operation of the check valve means 80, shown in detail in Fig. 4, are of particular importance. It will be noted that the check valve means 80 is provided with two annular seats 89 and 93 having ball valve elements 97 and 99 cooperating therewith, respectively, and in the event that one of the ball valve elements collects dirt or other foreign materials thereunder preventing it from seating, the other ball valve element picks up and holds the pressure load imposed by the fluid in the working system pipe 15, thus doubly insuring that the closing action of the check valve means 80 will be positive. In such an event, when the next surge of pressure fluid passes through the check valve means 80 from the piping 13 to the working system pipe 15, it will act to flush the dirt or foreign material under the ball valve element which has not been carrying the pressure fluid load, thus automatically cleaning the check valve means 80. By providing both ball valve elements 97 and 99 of the same diameter together with the other features of my construction, an unrestricted flow of fluid is permitted, a result not possible with prior types of devices.

Although I have shown and described my invention in simple and practical form, it will be understood that I do not intend to be limited to the particular construction shown but intend to be afforded the full scope of the following claims.

I claim as my invention:

1. In a valve device of the character described, the combination of: a housing having an aperture in one wall thereof; cylinder means attached to said housing so as to close said aperture; a piston in said cylinder means and having a piston member extending into said housing, said aperture being of such size that said piston and said piston member may be withdrawn from said housing through said aperture when said cylinder means is detached from said housing; spring means in said housing and engaging said piston so as to urge it in one direction in said cylinder means; a fluid passage adapted to convey an operating fluid under pressure; a pressure relief passage; valve means associated with said housing and adapted to connect said fluid passage and said pressure relief passage, said valve means having a part extending into said housing; connecting means in said housing for operatively connecting said piston member and said part; and passage means providing fluid communication between said fluid passage and the outer end of said cylinder means.

2. In a valve device of the character described, the combination of: a main housing having a cylinder means on one wall thereof; a piston in said cylinder means and extending into said main housing; spring means in said main housing and engaging said piston so as to urge it in one direction in said cylinder means; an auxiliary housing removably mounted on an opposite wall of said main housing having a pair of fluid ports; valve means in said auxiliary housing and adapted to connect said ports, said valve means normally being in closed position, and said valve means having a part extending into said main housing; connecting means in said main housing for operatively connecting said piston and said part whereby movement of said piston causes movement of said connecting means to open said valve means; and passage means providing fluid communication between one of said ports and the outer end of said cylinder means so as to admit pressure fluid to the end of said piston tending to move the same against the action of said spring means.

3. In a valve device of the character described, the combination of: a main housing having a cylinder means on one wall thereof; a piston in said cylinder means and extending into said main housing; an auxiliary housing removably mounted on an opposite wall of said main housing having a pair of fluid ports; receiving means in said auxiliary housing for receiving one end of a compression spring; a compression spring in said main housing having one end in engagement with said piston and the other end in said receiving means; adjustment means associated with said auxiliary housing for adjusting from the exterior of said auxiliary housing the compression of said spring; valve means in said auxiliary housing and adapted to connect said ports, said valve means normally being in closed position, and said valve means having a part extending into said main housing; connecting means in said main housing for operatively connecting said piston and said part whereby movement of said piston causes movement of said connecting means to open said valve means; and passage means providing fluid communication between one of said ports and the outer end of said cylinder means so as to admit pressure fluid to the end of said piston tending to move the same against the action of said spring.

4. In a valve device of the character described, the combination of: a main housing having a cylinder means on one wall thereof; a piston in said cylinder means and extending into said main housing; spring means in said main housing and engaging said piston so as to urge it in one direction in said cylinder means; an auxiliary housing removably mounted on an opposite wall of said main housing having a pair of fluid ports; axially movable piston valve means in said auxiliary housing and adapted to connect said ports, said valve means normally being in closed position, and said valve means having a part extending into said main housing; restraining means associated with said auxiliary housing for releasably retaining said piston valve means in a position in which it opens fluid communication between said ports; connecting means in said main housing for operatively connecting said piston and said part whereby movement of said piston causes movement of said connecting means to open said valve means; and passage means providing fluid communication between one of said ports and the outer end of said cylinder means so as to admit pressure fluid to the end of said piston tending to move the same against the action of said spring means.

5. In a valve device of the character described, the combination of: a main housing; cylinder means removably attached to one wall of said main housing; a piston in said cylinder means and extending into said main housing; spring means in said main housing and engaging said piston so as to urge it in one direction in said cylinder means; an auxiliary housing removably mounted on an opposite wall of said main housing having a pair of fluid ports; valve means in said auxiliary housing and adapted to connect said ports, said valve means normally being in closed position, and said valve means having a part extending into said main housing; connecting means in said main housing for operatively connecting said piston and said part whereby movement of said piston causes movement of said connecting means to open said valve means; an auxiliary cylinder removably attached to a wall of said main housing; a sleeve in said auxiliary cylinder having a roller mounted on the inner end thereof; a spring in said auxiliary cylinder and adapted to maintain said roller in pressure engagement with said connecting means; means associated with said auxiliary cylinder for adjusting the tension on said spring; and passage means providing fluid communication between one of said ports and the outer end of said cylinder means so as to admit pressure fluid to the end of said piston tending to move the same against the action of said spring means.

RODNEY B. CAMPBELL.